Dec. 11, 1962   J. K. MOSHER   3,067,972
IN-FLIGHT REFUELING APPARATUS FOR AIRCRAFT
Filed May 13, 1959   4 Sheets-Sheet 1
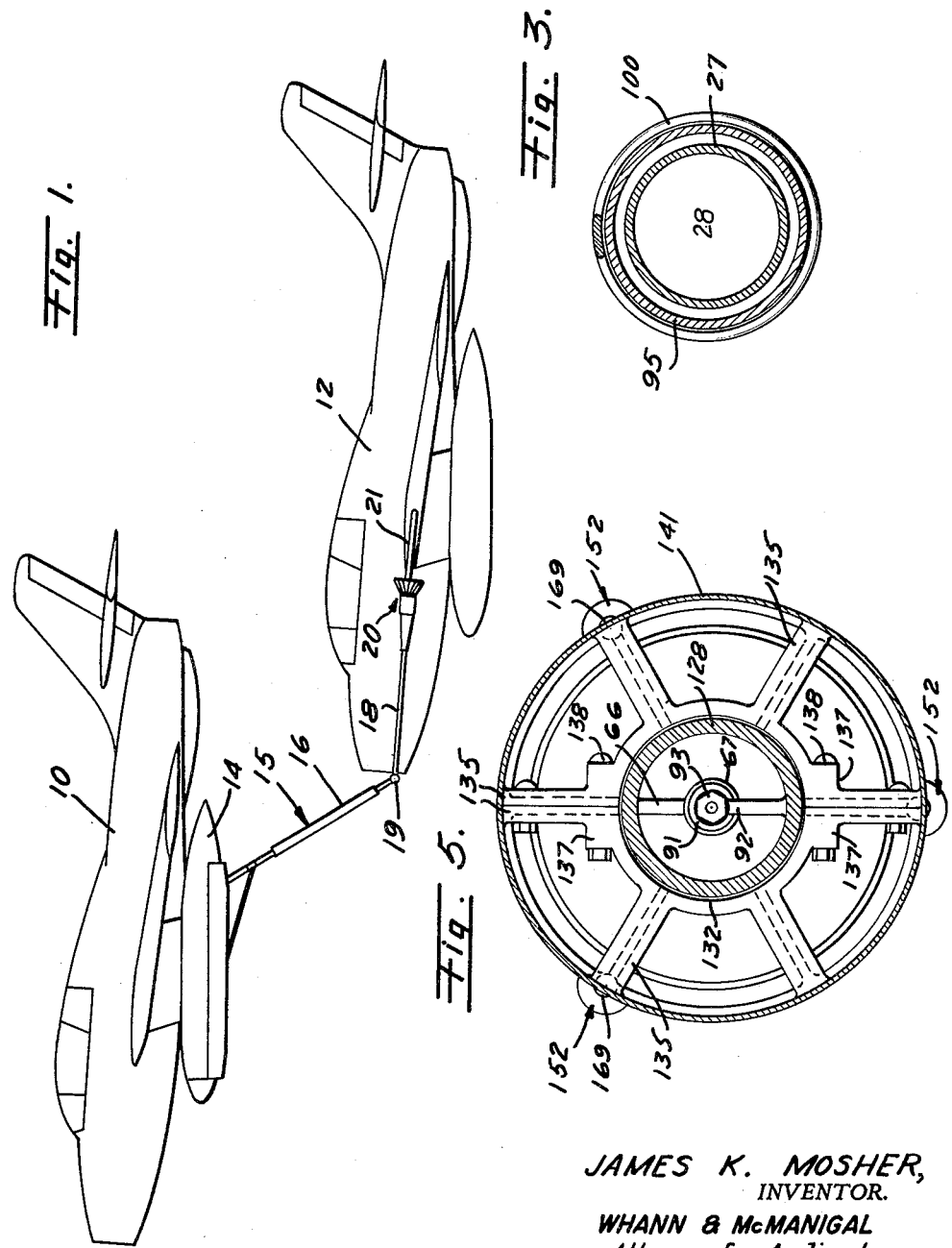
JAMES K. MOSHER,
INVENTOR.
WHANN & McMANIGAL
Attorneys for Applicant

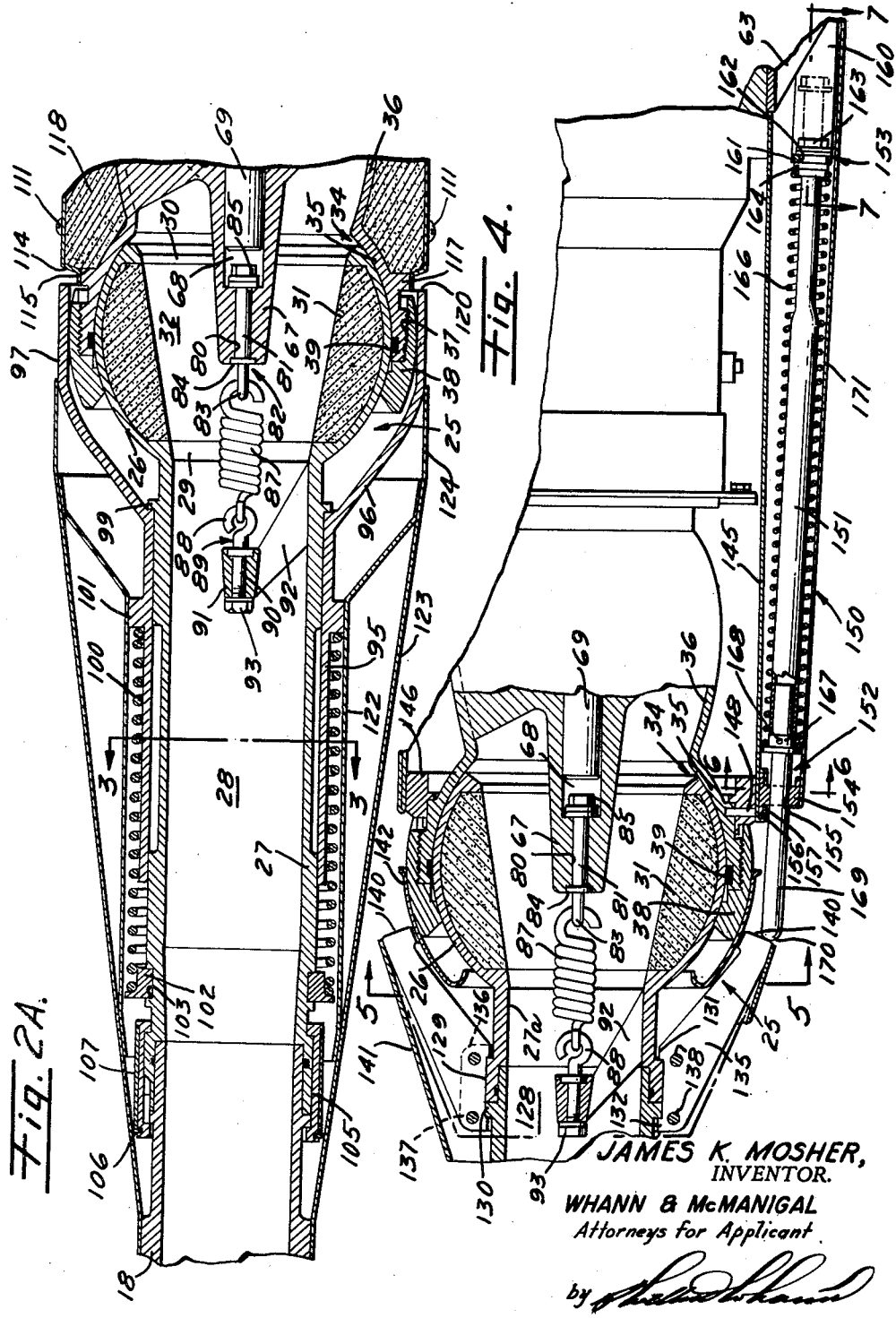

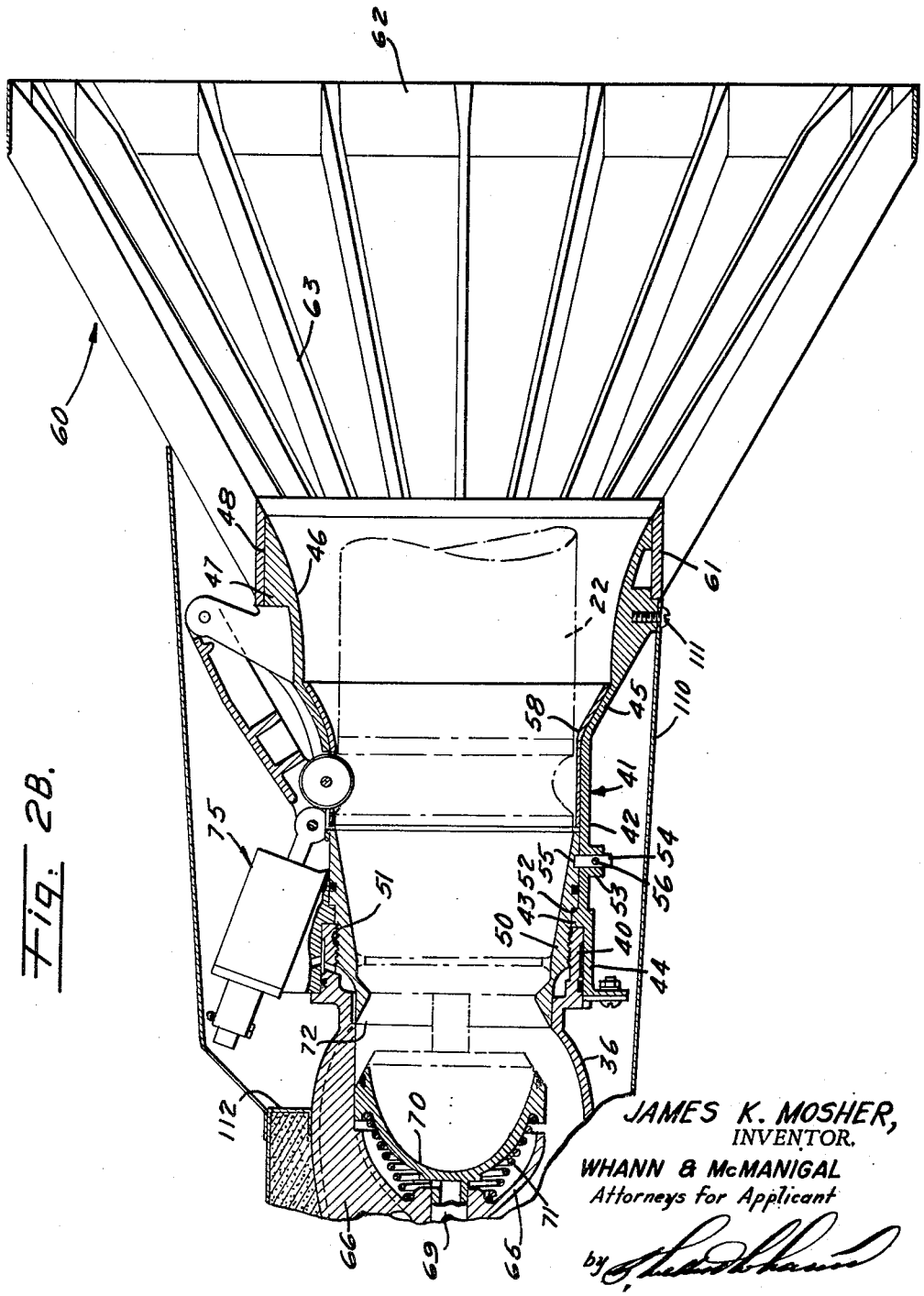

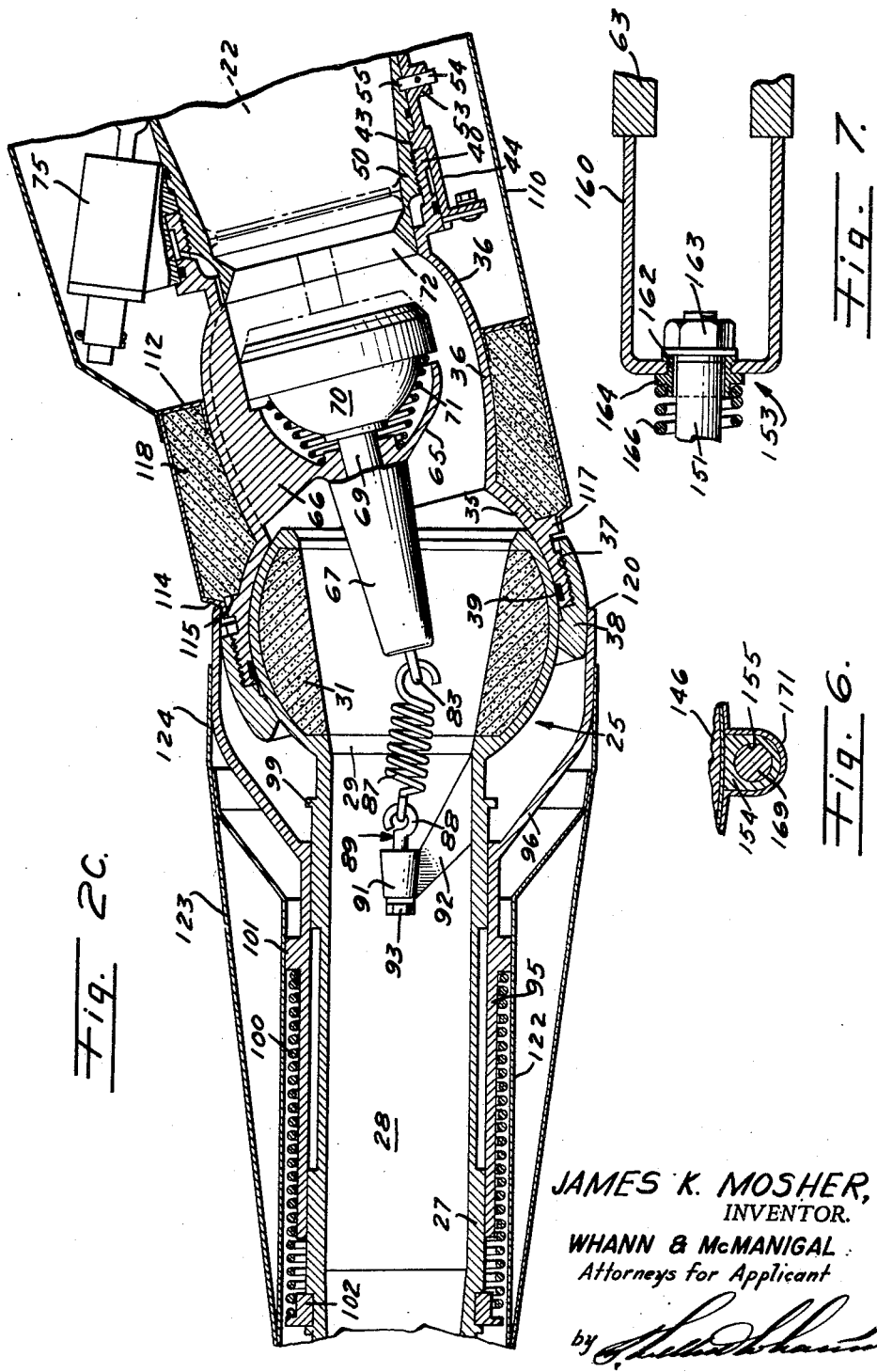

United States Patent Office 3,067,972
Patented Dec. 11, 1962

3,067,972
IN-FLIGHT REFUELING APPARATUS FOR AIRCRAFT
James K. Mosher, Pasadena, Calif., assignor to Schulz Tool and Manufacturing Co., San Gabriel, Calif., a corporation of California
Filed May 13, 1959, Ser. No. 812,887
16 Claims. (Cl. 244—135)

This invention relates generally to fueling systems and relates more particularly to an aircraft in-flight refueling system whereby fuel or the like may be transferred from one aircraft to another while in flight.

The invention has particular utility in the fueling of military aircraft while in flight from large tanker aircraft. Apparatus for transferring fuel from one aircraft to another while said aircraft are in flight is known. Such apparatus ordinarily utilizes a drogue on the end of a member trailing from the tanker aircraft, such drogue being adapted to cooperate with a probe extending forwardly from the aircraft to be fueled, the drogue and probe forming a fluid type coupling in the conduit for transferring fuel between the aircraft.

The present invention relates more particularly to the drogue with which the probe of the aircraft being refueled makes the fluid tight connection, the connection between the drogue and probe being effected in mid-air and is a universal connection to accommodate relative movements of the planes in flight.

Certain difficulties have been encountered with drogues heretofore used. One such difficulty resides in the excessive drag or resistance to the air when the drogue is moved to a position for connection with the aircraft to be refueled. Also, the drogue must be maintained in the proper position for the successful entry and operative connection therewith by the probe of the aircraft to be refueled. Considerable maneuvering of the latter may be required to effect such entry into and connection with the drogue by the probe. During such maneuvering the probe may strike the drogue in such a way as to move it out of such proper position and thereafter the effecting of the connection or coupling of the drogue and probe is rendered much more difficult if not impossible.

It is, therefore, an object of the present invention to provide an improved drogue which will eliminate the above difficulties.

It is another object of the invention to provide a drogue of this character having a very small amount of drag or wind resistance.

It is still another object of the invention to provide a device of this character having means for yieldingly maintaining same in the proper position for engagement, entry into and connection with the probe of an aircraft to be refueled.

It is a further object of the invention to provide a device of this character having means for automatically returning the drogue into the proper position for entry thereinto by the probe and connection between the parts, should said drogue be forced or moved out of such position during an unsuccessful attempt by the aircraft to be refueled to make the connection.

A further object of the invention is to provide a drogue of this character that is relatively simple and sturdy in construction and that is effective and reliable in operation.

The characteristics and advantages of the invention are further sufficiently referred to in connection with the following detailed description of the accompanying drawings which represent certain embodiments. After considering these examples, skilled persons will understand that variations may be made without departing from the principles disclosed, and I contemplate the employment of any structures, or arrangements or modes of operation that are properly within the scope of the appended claims.

Referring to the drawings which are for illustrative purposes only:

FIG. 1 is a schematic view of aircraft with a refueling system in coupled relationship and embodying the present invention;

FIG. 2A is a sectional view of one portion of the drogue of the present invention;

FIG. 2B is a longitudinal section of the other portion of said drogue, the conical or bell shaped member being in axial alignment with the pipe to which it is connected;

FIG. 2C is a partially longitudinally section view showing the conical or bell shaped member out of alignment with the pipe to which it is connected;

FIG. 3 is a sectional view taken on line 3—3 of FIG. 2A;

FIG. 4 is a partial sectional view of an alternative arrangement;

FIG. 5 is a cross sectional view taken on line 5—5 of FIG. 4;

FIG. 6 is a sectional view taken on line 6—6 of FIG. 4; and

FIG. 7 is a sectional view taken on line 7—7 of FIG. 4.

Referring more particularly to FIG. 1, there is shown a tanker aircraft 10 and a plane 12 to be refueled. The tanker 10 has a fuel tank 14 with an articulated fuel delivery mechanism, indicated generally at 15, said mechanism being shown in the depending refueling position. The mechanism 15 includes downwardly and rearwardly inclined pipes 16 having a connection at their upper end with the fuel tank 14. At the lower end there is a generally horizontal pipe 18 connected at one end to the pipes 16 by means of a universal joint arrangement 19. The opposite or free end of the pipe 18 carries a drogue, indicated generally at 20. The aircraft or plane 12 has a generally horizontal conduit 21, the forward end of which carries a probe 22, FIG. 2B.

Referring to FIG. 2A, there is a ball and socket joint, indicated generally at 25. The joint includes a member 26 which will be termed a ball member although said member is in the form of a spherical segment. At one end the ball member 26 is connected with a tubular sleeve 27, the passage 28 through the sleeve being connected with an opening 29 at the adjacent end of the ball member. It is to be noted that while these parts are shown as being formed integrally with each other, they may be separate parts which are connected together by any suitable means. At the side or end of the ball member 26 opposite the opening 29, there is a larger opening 30 and within the ball member an insert 31 is secured, said insert having a passage 32 therethrough which communicates with the openings 29 and 30 of the ball member and said passage 32 flares outwardly from the opening 29 to the opening 30. This insert is of any suitable material, one such material being "Lockfoam" B-614, manufactured by Nopco Chemical Co. of Los Angeles. This material is light and has a smooth surface finish.

The joint 25 also includes a socket, indicated generally at 34 which includes a spherical segment portion 35 which constitutes the forward part of a member 36 of the drogue. The socket part 35 has an externally threaded portion 37 for reception of an internally threaded socket ring 38 which serves to retain the ball member 26 within the socket. The part 35 of the socket is provided with an internal annular groove in which is disclosed a seal 39 of any suitable well-known character.

Referring to FIG. 2B, the member 36 is shown as being bulbous and being provided at its rearward end with an integral annular collar 40 which is internally threaded. There is a housing, indicated generally at 41, coaxially arranged relative to the collar 40 and including a tubular part 42 with an internal annular flange 43 adapted to abut against the outer end of the collar 40. The housing 41 also includes a cylindrical end portion 44 slidably received on the collar 40. The rearward end of the housing flares outwardly at 45 from the rear end of which there is a part 46 having an opening therein which flares outwardly and rearwardly, the part 46 having an outward enlargement 47 having a cylindrical surface 48.

Within the portion 42 of the housing 41 and extending into the collar, there is a sleeve 50 having a threaded portion 51 threadably received in the internally threaded portion of the collar. The sleeve has an external shoulder 52 which engages the flange 43 of the housing and clamps same against the adjacent end of the collar 40. Portion 42 of the housing also is provided with a boss 53 having an opening therein for reception of a pin 54 which extends into a recess 55 provided therefor in the sleeve 50. A cotter pin 56 or the like is received in openings provided therefor in the pin 54 and boss 53 to secure said pin in position and aid in securing the housing 41 to the collar 40. There is also a tubular insert 58 secured to the interior of the housing 41 between the outer end of the sleeve and the portion 46 of said housing. The insert may be secured in position by any suitable means such as screws, not shown. A cone, indicated generally at 60, has a collar 61 received on the boss 47 and secured thereon by any suitable means such as screws, not shown. From the collar 48 the cone flares outwardly and rearwardly and is provided with an annular ring 62 at the outer end. The collar 61 and the ring 62 are interconnected by a plurality of relatively thin struts 63 which are angularly spaced apart and have their planes radially arranged relative to the axis of the cone. As the struts are relatively thin, the cone offers little resistance to the air but serves as an effective guide for the probe of the plane to be refueled.

Within the member 36 there is a hemispherical shell 65 connected to the interior of said member by means of a web 66. The shell 65 is hollow with the open end facing outwardly or to the right, as shown in FIG. 2B. At the forward end of the shell there is a guide member 67 having an axial bore 68 which extends from the interior of the shell 65 and in which is slidably received the stem 69 of a poppet valve 70 which is urged outwardly, that is to the right as shown in FIG. 2B, by a spring 71 disposed within the shell and engageable with said poppet valve 70. The latter is adapted to operably engage a valve seat 72 formed at the inner end of the sleeve 50.

There is also hydraulic means for releasably and automaticaly latching the drogue and probe together so as to provide for a wide range of adjustment in latching force to meet various circumstances and requirements of the mechanism. This latching means is indicated at 75 and may be of the type disclosed in applicant's copending application for In-Flight Aircraft Refueling Apparatus, Serial No. 573,206, filed March 22, 1956, now Patent No. 2,946,605. Inasmuch as this part of the drogue does not form part of the present invention, it is believed to be unnecessary to describe same herein in detail.

From the inner end of the bore 68 of the guide 67 there is a reduced diameter bore 80 in which is received the shank 81 of an eye member, indicated generally at 82, there being an eye 83 at the end of said eye member which projects from the free end of said guide. Between the shank and the eye is a flange 84 which is received in a recess provided therefor in the free end of said guide. The free end of the shank, which extends into the bore 68, is threaded for reception of a nut 85 which secures the eye member in position.

One end of a spring 87 is hooked into the eye 83, the opposite end of said spring being connected to an eye 88 of an eye member 89 the shank 90 of which extends through a bore provided therefor in a boss 91 carried by a web 92 which extends into the passage 28 of the sleeve 27 and is shown as being formed integrally with said sleeve although it may be otherwise secured. The end of the eye member 89 opposite the eye 88 is threaded for reception of a nut 93 which secures said eye member in the boss 91. The spring 87, passage 28 and guide 67 are arranged coaxially.

On the sleeve 27 there is slidably disposed an external sleeve 95 which has a hollow cup-like member 96 at its outward end, said cup-like member 96 having a cylindrical portion 97 slidably disposed on the ring 38. The outer end of said sleeve 95 is adapted to engage an external flange 99 on the sleeve 27, said flange serving as a stop means limiting outward or rightward movement, FIG. 2A, of said sleeve 95.

Means is provided for urging said sleeve 95 outwardly, said means comprising a spring 100 which is disposed about said sleeve and a portion of sleeve 27 and reacts between an external annular flange 101 on the sleeve 95 and a spring retainer 102 disposed in an external annular groove 103 provided therefor in the sleeve 27.

The free end of the sleeve 27 is connected to the adjacent end of pipe 18 by any well-known means. One such means includes a coupling member 105 held in place by means of a snap ring 106 and a retainer ring 107 secured by a lock screw, not shown. This coupling arrangement is also disclosed in the above referred to copending application Serial No. 573,206, now Patent No. 2,946,605.

The member 36, housing 41 and a portion of the inner end of the cone 60, is covered by fairing 110 of well-known character. The fairing is secured by means of screws 111 and that portion of the fairing about the member 36 is provided with an outer end wall 112 and an inner end wall 114. The inner end wall 114 is annular and at the inner edge thereof there is an axially extending cylindrical portion 1.5 which is disposed on an external flange 117 of the socket 35. Within the chamber defined by the walls 112 and 114 is disposed a filler 118 which may be of the same material as the insert 31.

The wall 114 is positioned close to the outer free annular end 120 of the cup member 96.

Should the drogue be so engaged by the probe of the aircraft to be refueled as to move said drogue out of its normal axial alignment, as shown in FIG. 2C, a part of the shoulder or end wall 114 will engage the adjacent wall 120 of the cup-like member 96 and force the sleeve 95 to the left, as viewed in FIG. 2A. The spring 100 and the spring 87 resist the displacement of the drogue and should the probe fail to make proper connection with the drogue and be moved out of engagement therewith, the springs 87 and 100 will return the drogue to the proper axial alignment with the sleeve 27. It is to be noted that the major portion of the return movement of the drogue will be effected by the spring 100 and full alignment will be effected by the spring 87 after the sleeve 95 and cup member 96 have moved to the right to their limit of movement.

Internal and external fairing 122 and 123 respectively may be provided for the sleeves 27 and 95 and an adjacent portion of the pipe 18. The outer fairing 123 flares rearwardly to a cylindrical portion 124 in which the cup-like member 96 will slide, the rear end of the portion 124 receiving the cylindrical portion 97 of said cup-like member 96.

Referring to FIGS. 4 and 5, there is shown an alternative arrangement for maintaining the parts of the drogue in proper alignment.

In this arrangement, the sleeve carrying the ball 26 is shortened and is indicated at 27a. This sleeve is connected to an adjacent tubular member 128, said sleeve and member having external annular flanges 129 and 130 respectively which are engaged by ears 131 and 132 respectively of abutment members 135 which are annularly spaced about the coupled ends of the sleeve 27a and member 128 and which are secured in position on ears 136 and 137 respectively by means of screws 138. The abutment members 135 extend rearwardly and terminate in abutment ends 140. Fairing 141 may be provided to cover the abutment members 135 and adjacent portions of the sleeve 27a and tubular member 128. Also, the device may be provided with fairing 142 over a portion of the ball and socket joint 34.

The rearward portion of the drogue is provided with fairing 145 which is secured in any suitable manner, such as screws, not shown. An adapter ring 146 is secured to the outer side of the socket 35 by any suitable means such as, for example, split pins 148 of known character or the like.

Means for maintaining the parts of the drogue in alignment are provided and comprise a plurality of pressure units, indicated generally at 150. There may be any suitable number of said units 150 spaced about the rear part of the device, at least three such pressure units being required spaced apart equally.

Each of the units 150 comprises a plunger 151 having respective end portions slidably mounted in brackets 152 and 153 respectively.

The bracket 152 includes an ear portion 154 having an opening 155 therethrough. There are forwardly and rearwardly extending flanges 156 which are disposed beneath a rearwardly turned edge portion 157 of the fairing 145 to thereby secure the bracket 152 in position. The back turned portion 157 of the fairing is provided with an opening for reception of the ear 154.

The bracket 153 is generally U-shaped and includes side arms 160 which are attached to adjacent struts 63 of the cone or are formed integrally therewith as thus shown in FIG. 7. The closed end of the bracket 153 is indicated at 161 and is provided with an opening 162 which is aligned with the opening 155 of bracket 152. The rear end of the plunger 151 is provided with an externally threaded portion on which is secured a nut 163 for limiting leftward movement, as shown in FIG. 4, of said plunger. At the opposite side of the bracket 153 is a spring retainer 164 which abuts against the closed end 161 of the bracket and which is engaged by the rear end of a spring 166 disposed about the plunger 151. Adjacent the bracket 152 is a spring retainer 167 suitably secured to the rod 151 by means of a pin 168 or the like and against which the other end of said spring 166 engages. The plunger has a part 169 which extends forwardly of the bracket 152 and which has a rounded end 170 engaging the abutment end 140 of one of the abutment members 135. The spring 166 urges the plunger to the left, as shown in FIG. 4 but will yield to permit movement toward the right should the cone be moved out of alignment and in the direction of a respective unit 150. Upon release of pressure forcing the cone out of such alignment, the spring of the unit 150 will force the plunger leftwardly and effect straightening out of the parts of the device so that they are in the proper alignment referred to above.

The arrangement shown in FIG. 4 also includes the spring 37 which aids in maintaining the respective parts of the drogue in alignment. Fairing 171 may be disposed on the outer part of the drogue to cover the parts of the units 150 which extend rearwardly of the brackets 152.

It is thought that the invention and many of its attendant advantages will be understood from the foregoing description and is thought that it will be apparent that various changes may be made in the form, construction and arrangement of the parts of the invention without departing from the spirit and scope thereof or sacrificing all of its material advantages, the embodiments hereinbefore described being merely for purposes of illustration.

I claim:

1. A drogue for in-flight refueling apparatus, including: a tubular member; a ball part of a ball and socket joint connected to one end of said tubular member, said ball part being a spherical segment having a flow passage therethrough, a hollow member having the socket of said ball and socket joint secured to one end and operably connected to said ball member; a housing having one end secured to said hollow member and having a passageway therethrough which has an outwardly flaring rear end portion; a cone shaped member having a collar secured to the flaring outer free end of the housing; an annular member of greater diameter than said collar and spaced therefrom; a plurality of relatively thin annularly spaced struts interconnecting said collar and annular member, the planes of said struts being substantially radial relative to the axis of the cone shaped member; a guide secured within the hollow member and extending rearwardly into the passage through the ball member, said guide having a bore extending from the outer end; a movable valve member having a stem slidably disposed in said bore, a valve seat adjacent the outer end of said hollow member and adapted to be engaged by said movable valve member; spring means urging said movable valve member toward said seat; a coil spring having one end secured to the inner end of said guide; a boss disposed at the axis of said tubular member and connected to the wall of said member; means securing the other end of said spring to said boss to normally exert a pull on the inner end of said guide along the axis of said tubular member and ball; a sleeve slidable on said tubular member and having a cup-shaped part on the outer end thereof in which a portion of the ball and socket joint is received; means defining an annular shoulder disposed closely adjacent to but spaced from the free edge of the cup-like part; means limiting movement of said sleeve and cup-like part toward said shoulder; and spring means urging said sleeve and cup-like part toward said shoulder.

2. In a drogue for in-flight refueling apparatus: a tubular member; a ball part of a ball and socket joint connected to one end of said tubular member, said ball part being a spherical segment having a flow passage therethrough, a hollow member having the socket of said ball and socket joint secured to one end and operably connected to said ball member; a housing having one end secured to said hollow member and having a passageway therethrough; a cone shaped member having the smaller end secured to the free end of the housing, said cone shaped member including a plurality of relatively thin annularly spaced struts, the planes of which are substantially radial relative to the axis of the cone shaped member; a guide secured within the hollow member; a coil spring having one end secured to the inner end of said guide; a boss disposed at the axis of said tubular member and connected to the wall of said member; and means securing the other end of said spring to said boss to normally exert a pull on the inner end of said guide along the axis of said tubular member and ball.

3. In a drogue for in-flight refueling apparatus: a tubular member; a ball part of a ball and socket joint connected to one end of said tubular member, said ball part being a spherical segment having a flow passage therethrough, a hollow member having the socket of said ball and socket joint secured to one end and operably connected to said ball member; a housing having one end secured to said hollow member and having a passageway therethrough; a cone shaped member having the smaller end thereof secured to the free end of the housing, said cone shaped member including a plurality of relatively thin annularly spaced struts, the planes of said struts being substantially radial relative to the axis of the cone shape member; a sleeve slidable on said tubular member and having a cup-shaped part on the outer end thereof in which a portion of the ball and socket joint is received; means defining an annular shoulder disposed adjacent to the free edge of the cup-like part; means limiting movement of said sleeve and cup-like part toward said shoulder; and spring means urging said sleeve and cup-like part toward said shoulder.

4. In a drogue for in-flight refueling apparatus: front and rear parts through which fluid is adapted to flow; a ball and socket joint having a passage therethrough, the ball being connected to one of the drogue parts and the socket being connected to the other part; a member at the rear end of the rear drogue part, said member flowing outwardly and including a plurality of annularly spaced struts; pressure applying means slidable on one of the drogue parts and including an external cup-shaped part, the free edge of which is normally in a plane normal to the axis of the drogue; means defining an annular shoulder on the other drogue part and normally disposed in a plane substantially parallel to the plane of the free edge of said cup-shaped part; and spring means urging said cup-like part toward said shoulder.

5. In a drogue for in-flight refueling apparatus: front and rear parts through which fluid is adapted to flow; a ball and socket joint having a passage therethrough, the ball being connected to one of the drogue parts and the socket being connected to the other part; a member at the rear end of the rear drogue part, said member flowing outwardly; pressure applying means slidable on one of the drogue parts and including an external cup-shaped part, the free edge of which is normally in a plane normal to the axis of the drogue; means defining an annular shoulder on the other drogue part and normally disposed in a plane substantially parallel to the plane of the free edge of said cup-shaped part; and spring means urging said cup-like part toward said shoulder.

6. A drogue for in-flight refueling apparatus, including: a tubular member; a ball part of a ball and socket joint connected to one end of said tubular member, said ball part being a spherical segment having a flow passage therethrough, a hollow member having the socket of said ball and socket joint secured to one end and operably connected to said ball member; a housing having one end secured to said hollow member and having a passageway therethrough which has an outwardly flaring rear end portion; a cone shaped member having a collar secured to the flaring outer free end of the housing; an annular member of greater diameter than said collar and spaced therefrom; a plurality of relatively thin annularly spaced struts interconnecting said collar and annular member, the planes of said struts being substantially radial relative to the axis of the cone shaped member; a guide secured within the hollow member and extending rearwardly into the passage through the ball member, said guide having a bore extending from the outer end; a movable valve member having a stem slidably disposed in said bore, a valve seat adjacent the outer end of said hollow member and adapted to be engaged by said movable valve member; spring means urging said movable valve member toward said seat; yielding means disposed within the passage through the drogue and having an anchor on the axis of the tubular member exerting a substantially axial pull on the rear portion of the drogue for maintaining forward and rear portions thereof in axial alignment; and external pressure applying aligning means including contact means on one of the parts of the drogue and spring means on the other part of the drogue adapted to apply pressure to the contact means to maintain the parts of the drogue in axial alignment and to return same to such alignment should one part be moved out of such alignment.

7. A drogue for in-flight refueling apparatus, including: a tubular member; a ball part of a ball and socket joint connected to one end of said tubular member, said ball part being a spherical segment having a flow passage therethrough, a hollow member having the socket of said ball and socket joint secured to one end and operably connected to said ball member; a housing having one end secured to said hollow member and having a passageway therethrough which has an outwardly flaring rear end portion; a cone shaped member having a collar secured to the flaring outer free end of the housing; an annular member of greater diameter than said collar and spaced therefrom; a plurality of relatively thin annularly spaced struts interconnecting said collar and annular member, the planes of said struts being substantially radial relative to the axis of the cone shaped member; and means disposed internally of said drogue for urging said ball part and said hollow member into alignment relative to each other.

8. In a drogue for in-flight refueling apparatus: front and rear drogue parts through which fluid is adapted to flow; a ball and socket joint having a passage therethrough, the ball being connected to one of the drogue parts and the socket being connected to the other part; a member at the rear end of the rear drogue part, said member flaring outwardly and including a plurality of annularly spaced struts; and yielding means within the drogue interconnecting the front and rear parts adjacent the axis thereof for urging said parts into alignment relative to each other.

9. In a drogue for in-flight refueling apparatus: front and rear drogue parts through which fluid is adapted to flow; a ball and socket joint having a passage therethrough, the ball being connected to one of the drogue parts and the socket being connected to the other part; an outwardly flaring member at the rear end of the rear drogue part; and yielding means within the drogue interconnecting the front and rear parts adjacent the axis thereof for urging said parts into alignment relative to each other.

10. In a drogue for in-flight refueling apparatus: front and rear drogue parts through which fluid is adapted to flow; a ball and socket joint having a passage therethrough, the ball being connected to one of the drogue parts and the socket being connected to the other part; an outwardly flaring member at the rear end of the rear drogue part; and means disposed internally of the drogue for urging said parts into alignment relative to each other.

11. In a drogue for in-flight refueling apparatus: front and rear drogue parts through which fluid is adapted to flow; a ball and socket joint having a passage therethrough, the ball being connected to one of the drogue parts and the socket being connected to the other part; an outwardly flaring member at the rear end of the rear drogue part; yielding means within the drogue interconnecting the front and rear parts adjacent the axis thereof for urging said parts into axial alignment relative to each other; and external means for yieldingly urging the parts of the drogue into alignment with each other.

12. A drogue for in-flight refueling apparatus, including: a tubular member; a ball part of a ball and socket joint connected to one end of said tubular member, said ball part being a spherical segment having a flow passage therethrough, a hollow member having the socket of said ball and socket joint secured to one end and operably connected to said ball member; a housing having one end secured to said hollow member and having a passageway therethrough which has an outwardly flaring rear end portion; a cone shaped member having a collar secured to the flaring outer free end of the housing; an annular member of greater diameter than said collar and spaced therefrom; a plurality of relatively thin annularly spaced struts interconnecting said collar and annular member, the planes of said struts being substantially radial relative to the axis of the cone shaped member; a guide secured within the hollow member and extending rearwardly into the passage through the ball member, said guide having a bore extending from the outer end; a movable valve member having a stem slidably disposed in said bore, a valve seat adjacent the outer end of said hollow member and adapted to be engaged by said movable valve member; spring means urging said movable valve member toward said seat; a coil spring having one end secured to the inner end of said guide; a boss disposed at the axis of said tubular member and connected to the wall of said member; means securing the other end of said spring to said boss to normally exert a pull on the inner end of said guide along the axis of said tubular member and ball; a plurality of annularly spaced abutment members having their free ends faced rearwardly and being radial relative to the ball part of the ball and socket joint; a plunger for each of the abutment members, the plungers extending longitudinally of the rearward part of the drogue and having their forward ends engaging the abutment faces of the respective abutment members; a bracket for each plunger secured to the socket part of the ball and socket joint and having an opening therethrough for slidable reception of the forward part of the respective plunger; a rear bracket for each plunger, each rear bracket being generally U-shaped with an opening in the closed end of the U aligned with the opening in the forward bracket and slidably receiving a rear end portion of the plunger, the ends of the arms of the rear bracket opposite the closed end thereof being carried by respective struts of the cone shaped member; a spring disposed about each plunger and urging same forwardly; and means limiting forward movement of each plunger, said last mentioned spring by urging said plungers forwardly yieldingly urges the rear portion of the drogue into axial alignment with the forward portion thereof.

13. A drogue for in-flight refueling apparatus, including: a tubular front drogue part; a ball part of a ball and socket joint connected to one end of said tubular member, said ball part being a spherical segment having a flow passage therethrough, a hollow member having the socket of said ball and socket joint secured to one end and operably connected to said ball member; a rear drogue part including a housing having one end secured to said hollow member and having a passageway therethrough which has an outwardly flaring rear end portion; a cone shaped member having a collar secured to the flaring outer free end of the housing; an annular member of greater diameter than said collar and spaced therefrom; a plurality of relatively thin annularly spaced struts interconnecting said collar and annular member, the planes of said struts being substantially radial relative to the axis of the cone shaped member; a plurality of annularly spaced abutment members having their free ends faced rearwardly and being radial relative to the ball part of the ball and socket joint; a plunger for each of the abutment members, the plungers extending longitudinally of the rearward part of the drogue and having their forward ends engaging the abutment faces of the respective abutment members; a bracket adjacent each end of each plunger, said brackets being secured to the rear drogue part having an opening therethrough for slidable reception of the respective plungers; a spring disposed about each plunger and urging same forwardly; and means limiting forward movement of each plunger, said spring by urging said plungers forwardly yieldingly urges the rear portion of the drogue into axial alignment with the forward portion thereof.

14. A drogue for in-flight refueling apparatus, including: a tubular front drogue part; a ball part of a ball and socket joint connected to one end of said tubular member, said ball part being a spherical segment having a flow passage therethrough, a hollow member having the socket of said ball and socket joint secured to one end and operably connected to said ball member; a rear drogue part including a housing having one end secured to said hollow member and having a passageway therethrough which has an outwardly flaring rear end portion; a cone shaped member having a collar secured to the flaring outer free end of the housing; an annular member of greater diameter than said collar and spaced therefrom; a plurality of relatively thin annularly spaced struts interconnecting said collar and annular member, the planes of said struts being substantially radial relative to the axis of the cone shaped member; a plurality of annularly spaced abutment members having their free ends faced rearwardly and being radial relative to the ball part of the ball and socket joint; a plunger for each of the abutment members, the plungers extending longitudinally of the rearward part of the drogue and having their forward ends engaging the abutment faces of the respective abutment members; a bracket adjacent each end of each plunger, said brackets being secured to the rear drogue part having an opening therethrough for slidable reception of the respective plungers; and a spring disposed about each plunger and urging same forwardly.

15. In a drogue for in-flight refueling apparatus: front and rear drogue parts through which fluid is adapted to flow; a ball and socket joint having a passage therethrough, the ball being connected to one of the drogue parts and the socket being connected to the other part; an annular collar on the rear end of the rear drogue part; an annular member of greater diameter than said collar and spaced axially therefrom; a plurality of relatively thin annularly spaced struts interconnecting said collar and annular member to form a cone shaped member, the planes of said struts being substantially radial relative to the axis of said cone shaped member; and yielding means within said drogue for urging said parts into alignment relative to each other.

16. In a drogue for in-flight refueling apparatus: front and rear drogue parts through which fluid is adapted to flow; a ball and socket joint having a passage therethrough, the ball being connected to one of the drogue parts and the socket being connected to the other part; an annular collar on the rear end of the rear drogue part; an annular member of greater diameter than said collar and spaced axially therefrom; a plurality of relatively thin annularly spaced struts interconnecting said collar and annular member to form a cone shaped member, the planes of said struts being substantially radial relative to the axis of said cone shaped member; yielding means within said drogue for urging said parts into alignment relative to each other; and yielding means disposed externally of the drogue for urging said parts into alignment relative to each other.

References Cited in the file of this patent

UNITED STATES PATENTS

| | | |
|---|---|---|
| 1,087,256 | Pumphrey | Feb. 17, 1914 |
| 1,462,830 | Robinson | July 24, 1923 |
| 2,243,618 | Brown | May 27, 1941 |
| 2,582,609 | Steele | Jan. 15, 1952 |
| 2,692,102 | Cobham et al. | Oct. 19, 1954 |
| 2,716,527 | Latimer-Needham | Aug. 30, 1955 |
| 2,761,701 | Morse et al. | Sept. 4, 1956 |
| 2,797,936 | LeClair | July 2, 1957 |
| 2,898,060 | Everhart | Aug. 4, 1959 |

FOREIGN PATENTS

| | | |
|---|---|---|
| 782,788 | Great Britain | Sept. 11, 1957 |

OTHER REFERENCES

Aviation Week, page 34, July 8, 1957, volume 67, No. 1.